(12) United States Patent
Hawkins et al.

(10) Patent No.: US 8,423,619 B2
(45) Date of Patent: Apr. 16, 2013

(54) MESSAGE BROKERING IN A CONSUMING BROKER DEVICE

(75) Inventors: John Christopher Hawkins, Southhampton (GB); Francis N. Parr, New York, NY (US); Hao Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 12/727,831

(22) Filed: Mar. 19, 2010

(65) Prior Publication Data

US 2010/0241717 A1      Sep. 23, 2010

(30) Foreign Application Priority Data

Mar. 20, 2009    (EP) .................................... 09155710

(51) Int. Cl.
*G06F 15/16*        (2006.01)
(52) U.S. Cl.
USPC ............ 709/206; 709/201; 709/203; 709/204

(58) Field of Classification Search ................... 709/201, 709/202, 204, 206, 246, 203; 705/345; 707/E17.006
See application file for complete search history.

(56) References Cited

U.S. PATENT DOCUMENTS

| 7,103,680 B1 * | 9/2006 | Holdsworth et al. .......... 709/246 |
| 2006/0136256 A1 * | 6/2006 | Roots et al. ....................... 705/1 |

\* cited by examiner

*Primary Examiner* — Frantz Jean
(74) *Attorney, Agent, or Firm* — Steven L. Nichols; Van Cott, Bagley, Cornwall & McCarthy P.C.

(57) ABSTRACT

Message brokering in a consuming broker device of a publish-subscribe system having at least one processor includes: designating in the consuming broker device a first producing broker device as a sole provider of messages having a topic to which the consuming broker device has subscribed; and in response to a determination that a measured livelihood of the first producing broker device is less than a defined threshold, designating with the consuming broker device a second producing broker device as the sole provider of the messages having the topic to the consuming broker device. The second producing broker device has a measured livelihood that is greater than the measured livelihood of the first producing broker device.

20 Claims, 6 Drawing Sheets

MESSAGE BROKERING IN A CONSUMING BROKER DEVICE

RELATED APPLICATIONS

Pursuant to 35 U.S.C. §119(b) and 37 C.F.R. §1.55(a), the present application corresponds to and claims the priority of European Patent Application No. 09155710.8 filed on Mar. 20, 2009, the disclosure of which is incorporated herein by the reference in its entirety.

BACKGROUND

Aspects of the present invention relate to the field of message broker networks, and particularly to the resolution of producer to consumer paths in a broker network.

Publish-subscribe systems provide a powerful message broker solution driven by business rules. In these systems, diverse applications can exchange information in dissimilar forms, with brokers handling the processing required for the information to arrive in the right place in the correct format, according to the rules that are defined. This exchange does not require that applications implement any additional communication protocols beyond their own conventions and requirements.

A data flow defines connected nodes in a publish-subscribe system, where each node defines an operation to occur with respect to a received message. Nodes typically process a single message at a time and feed single messages to downstream nodes. At the node, the content of the messages may be processed, transformed, and a new message generated to route to another node or location including the transformed data. A data flow represents the sequence of operations performed on a message on the basis of rules that operate on the message's format and content.

In message broker environments there is the potential that multiple message brokers could offer particular translations (services) and that a route has to be dynamically created in order to achieve the final transformation goal. For instance, a consumer in a publish/subscribe paradigm may require a message from "the broker network" in a first format. However, that message may be originally published onto the network in a second format by the producer. In this situation, a route through the broker network of the publish/subscribe paradigm may be dynamically generated such that the message experiences the appropriate transformations to convert the message from the second format to the first format. In addition, such a route must also implement a suitable transmission path from the message producer to the consumer. The messages in a publish/subscribe paradigm are typically non-persistent and therefore timeliness is of paramount importance.

In order to achieve a level of high-availability, in such an environment, it is possible that multiple paths be created within the broker network such that for each producer there is a guarantee that there is at least one good path through the network to the consumer, at any given point in time.

BRIEF SUMMARY

A method of message brokering in a consuming broker device of a publish-subscribe system having at least one processor includes: designating in the consuming broker device a first producing broker device as a sole provider of messages having a topic to which the consuming broker device has subscribed; and in response to a determination that a measured livelihood of the first producing broker device is less than a defined threshold, designating with the consuming broker device a second producing broker device as the sole provider of the messages having the topic to the consuming broker device. The second producing broker device has a measured livelihood that is greater than the measured livelihood of the first producing broker device.

A consuming broker device in a publish-subscribe system includes at least one processor and an input port configured to receive messages having a topic to which the consuming broker has subscribed. The processor is configured to: designate a first producing broker device as a sole provider of the messages having the topic to the consuming broker device; and in response to a determination that a measured livelihood of the first producing broker device is less than a defined threshold, designate a second producing broker device as the sole provider of the messages having the topic to the consuming broker device. The second producing broker device has a measured livelihood that is greater than the measured livelihood of the first producing broker device.

A computer program product for message brokering in a consuming broker device of a publish-subscribe system includes a computer readable storage medium having computer readable program code embodied therewith. The computer readable program code includes: computer readable program code configured to designate a first producing broker device as a sole provider of messages having a topic to which the consuming broker device has subscribed; and computer readable program code configured to, in response to a determination that a measured livelihood of the first producing broker device is less than a defined threshold, designate with the consuming broker device a second producing broker device as the sole provider of messages having the topic to the consuming broker device. The second producing broker devices has a measured livelihood that is greater than the measured livelihood of the first producing broker device.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses methods and systems for brokering messages in a publish-subscribe system. Specifically, the principles of the present specification provide a solution for optimizing the performance of a publish-subscribe system by reducing the duplication of published messages over redundant messaging routes, thereby freeing up messaging bandwidth and processing resources. Additionally, the present specification provides methods of dynamically adjusting messaging routes according to the health of upstream nodes to expand resilience and reliability in the publish-subscribe system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As used in the present specification and in the appended claims, the term "publish-subscribe system" of "publish-subscribe paradigm" refers to an asynchronous messaging paradigm in which publishers broadcast messages over a network that are selectively received by consumers on that network subscribing to one or more topics of interest.

As used in the present specification and in the appended claims, the term "producing broker device" refers to an electronic device configured to publish content over a publish-subscribe system.

As used in the present specification and in the appended claims, the term "consuming broker device" refers to an electronic device configured to receive content over a publish-subscribe system based on one or more subscriptions and forward at least some of the received content to additional subscribers.

As used in the present specification and in the appended claims, the term "livelihood," when referring to a specific device, refers to a general measure of the activity and/or health of that specific device.

Figure 1:
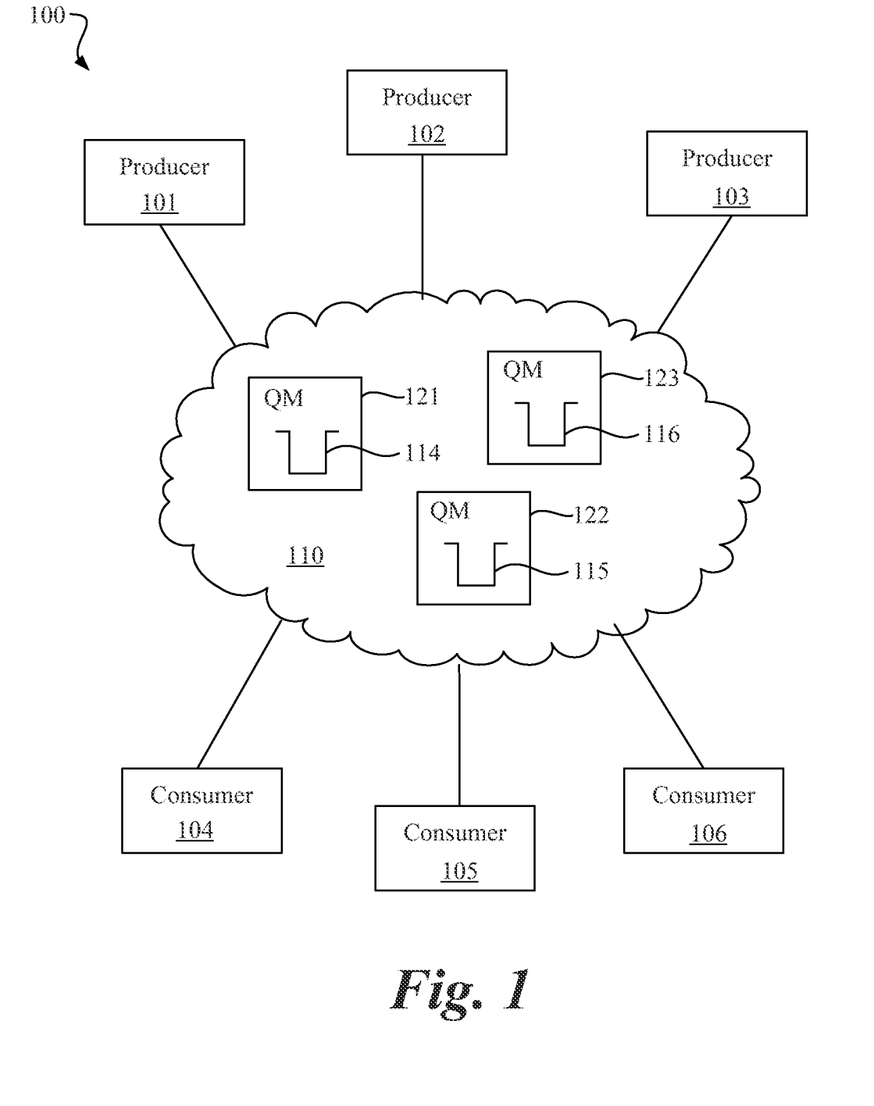
FIG. 1 is a block diagram of an illustrative messaging environment according to one exemplary embodiment of principles described herein.

Referring to FIG. 1, a general illustration of a messaging environment 100 is provided. A messaging environment 100 may take many different forms of varying complexity and FIG. 1 is intended as an example illustration only. The messaging environment 100 includes one or more message producers 101-103 and one or more message consumers 104-106. A single entity may be both a message producer and consumer. The message producers 101-103 and consumers 104-106 may be messaging applications or Message Driven Beans (MDBs).

A messaging system 110 handles the message delivery between producers 101-103 and consumers 104-106. The messaging system 110 can be complex, involving multiple queues, multiple applications, routing of messages and intermediary applications that may alter the content of the message, etc. The messaging system 110 may be spread across a network such as a WAN (wide area network), for example, the Internet.

In messaging systems 110, data intended for a consumer 104 is placed by a producer 101 on a message queue 114-116. The messaging system 110 stores the data until the consumer 104 retrieves the data.

In some messaging environments 100, a messaging system 110 includes one or a network of message brokers which receive incoming messages and perform actions on the messages such as routing, transforming, aggregating and decomposing messages, interaction with an external repositories to augment a message or store it, invoking Web services to retrieve data, respond to events or errors, provide content and topic-based message routing using the publish/subscribe model. The message queues 114-116 may be, for example, held by a queue manager 121-123 of one or more brokers.

Figure 2:
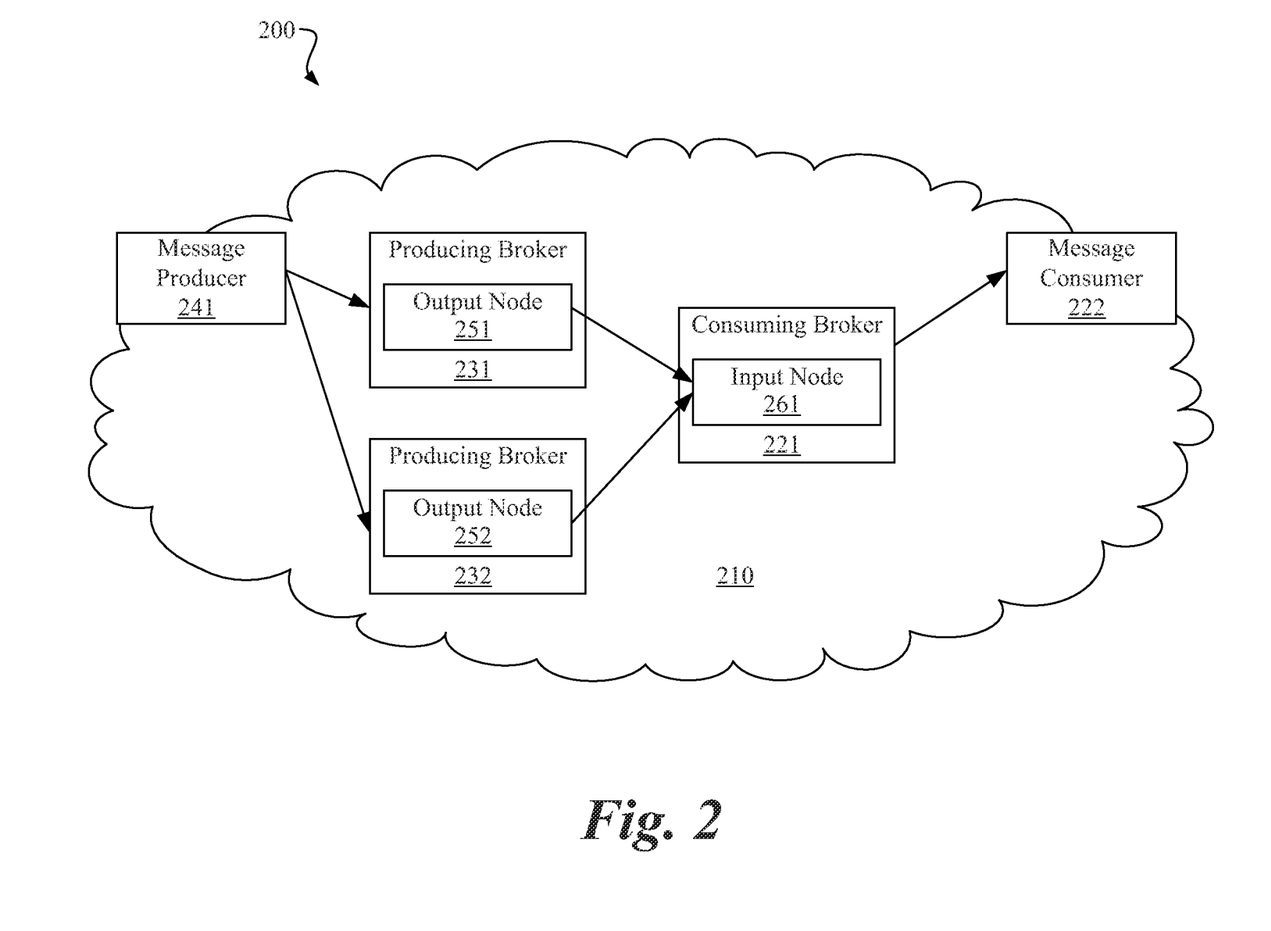
FIG. 2 is a block diagram of an illustrative network of message brokers according to one exemplary embodiment of principles described herein.

Referring to FIG. 2, a network 200 of message brokers is provided across a WAN 210. The described method and system allow the selection of producing brokers 231, 232 by a consuming broker 221 allowing preferential routes to be established through the broker network 200.

A consuming message broker 221 receives a message from a producing message broker 231 where the brokers are operating in a WAN environment, and the producing broker is fed by a single producer 241, for example from the WAN edge. A second producing broker 232 can be introduced and the two producing brokers 231, 232 continue to be fed by the single producer 241. Each producing broker 231, 232 consumes the original feed of messages, does some work on the messages and then publishes the result to the consuming broker 221 which publishes it to a message consumer 222. The result will be the same from both producing brokers 231, 232 resulting in duplicate messages being received by the consuming broker 221.

In order to avoid the duplication of messages being received at the consuming broker 221, a constant path needs to be maintained through the broker network. A chain of producing and consuming brokers can be configured for transformation of messages.

In the described method and system, a transport protocol between the producing broker output node 251, 252 and the consuming broker input node 261 is defined including ownership functionality.

Ownership functionality specifies at the output node of a producing broker and the input node of a consuming broker that there is a unique or single ownership policy in place, such that if two or more messages are available on the same topic, only one will be received. Using such ownership functionality, a highly-available broker WAN system can be extrapolated to multiple brokers and multiple topics. A preferred route is effectively created.

The choice of which message is to be received is determined by the concept of liveliness of a producing broker providing a message. A fail-over semantic based on the liveliness provides the capability to switch over automatically between message producing brokers. For example, upon a determination that the measured livelihood of first designated producing broker has fallen below a defined threshold, the consuming broker may switch its designated producing broker for a particular subscription to a second producing broker that has a measured liveliness greater than that of the first producing broker and greater than the defined threshold. The liveliness is determined by heartbeats from a producing broker. In one embodiment, the strength of the liveliness is determined and used to select the message.

A user defines heartbeats on a producing broker in the cases where violation of deadline is not sufficient to tell whether a publisher is still alive or not. For example, where the publisher may be irregular but wishes to still maintain ownership.

There may be two types of heartbeat—that of automatic or manual.

Manual—a user prods the publisher to send out a heartbeat message to the consumers—this system is more diff to code and shows that the actual publisher is alive rather than the underlying infrastructure that the publisher is using.

Automatic—a user tells the system when to send out heartbeats and the system sends them "under the covers". This is easier to code and does not show that the publisher itself is alive, just that the infrastructure is.

Liveliness and deadlines are used to work out who is "alive" and available to publish; however, there may be a separate strength number that each producing broker has defined by the user.

In one example embodiment, the ownership functionality is provided by a transport protocol in the form of the wire protocol Real-time publish/subscribe (RTPS) supporting Data Distribution Service (DDS). DDS has an in-built Quality of Service called Ownership, which states that where there are two or more feeds of data on the same topic and where the topic is designated as "single ownership", only one of the producer's output will be consumed at any given point in time.

The described system and method are described in the context of DDS; however, DDS is merely the specification for the concept and the corresponding functions of DDS can be implemented in other technologies.

DDS is an OMG (Object Management Group) standard that provides a specification of a publish/subscribe middleware for local, peer-to-peer networks that simplifies network programming. It implements a publish/subscribe model for sending and receiving data, events, and commands among the nodes. Nodes that are producing create "topics" and publish "samples".

DDS allows the user to specify Quality of Service (QoS) parameters as a way to configure automatic-discovery mechanism and specify the behaviour used when sending and receiving messages. The mechanisms are configured up-front and control aspects of the DDS. QoS is comprised of individual QoS policies.

The Ownership Policy of DDS includes two kinds of Ownership: Shared and Exclusive. Exclusive Ownership indicates that each instance of a data-object can only be modified by one data writer. At any point in time a single data writer owns each instance. The owner is determined by selecting the data writer with the highest value of the Ownership Strength Policy that is both "alive" as defined by the Liveliness Policy and has not violated its Deadline contract with regards to the data-instance.

The Liveliness Policy controls the mechanism and parameters used by DDS to ensure that particular entities on the network are still alive. The Deadline Policy establishes on the subscribing side a minimum requirement for the remote publishers that are expected to supply the data values. Assuming that the reader and writer have compatible settings, the fulfillment of the contract is monitored by DDS.

The described method and system creates a network of brokers that can form chains using the ownership policy to ensure transformations of messages across a potentially global network. When a higher strength broker comes on line, then it is deemed to be the producer of choice.

Brokers may be developed from a need to add a higher-level of usage pattern to standard messaging environments, such as IBM WebSphere MQ.

A broker generally consists of a number of runtime parts including a runtime environment where messages enter the system and exit the system and some tasks have been performed during the process. This is often referred to as the flow where a flow is a configuration of steps (often referred to as nodes). A step may either manipulate the message or utilise it to perform some action. Actions include logging the message, putting the message into a database, and executing a process based on the message. Some example manipulations include: adding data from a database based on information held in the original message; or adding information into the message based on some other criteria, for example, the current price of something.

The runtime environment usually ensures that each flow is held in its own execution environment such that each flow is isolated to ensure that, for example, a miswritten flow cannot bring down a system.

A flow is driven by the arrival of a message into an entry point node. This node may be receiving messages from a messaging system such as WebSphere MQ or from other transports such as HTTP. Flows have at least one entry point and at least one exit point. The exit point may not necessarily move the message to another destination; it may for example log it.

A key function of many brokers is that they can receive a message in one format and output in another i.e. they transform the message.

Figure 3:
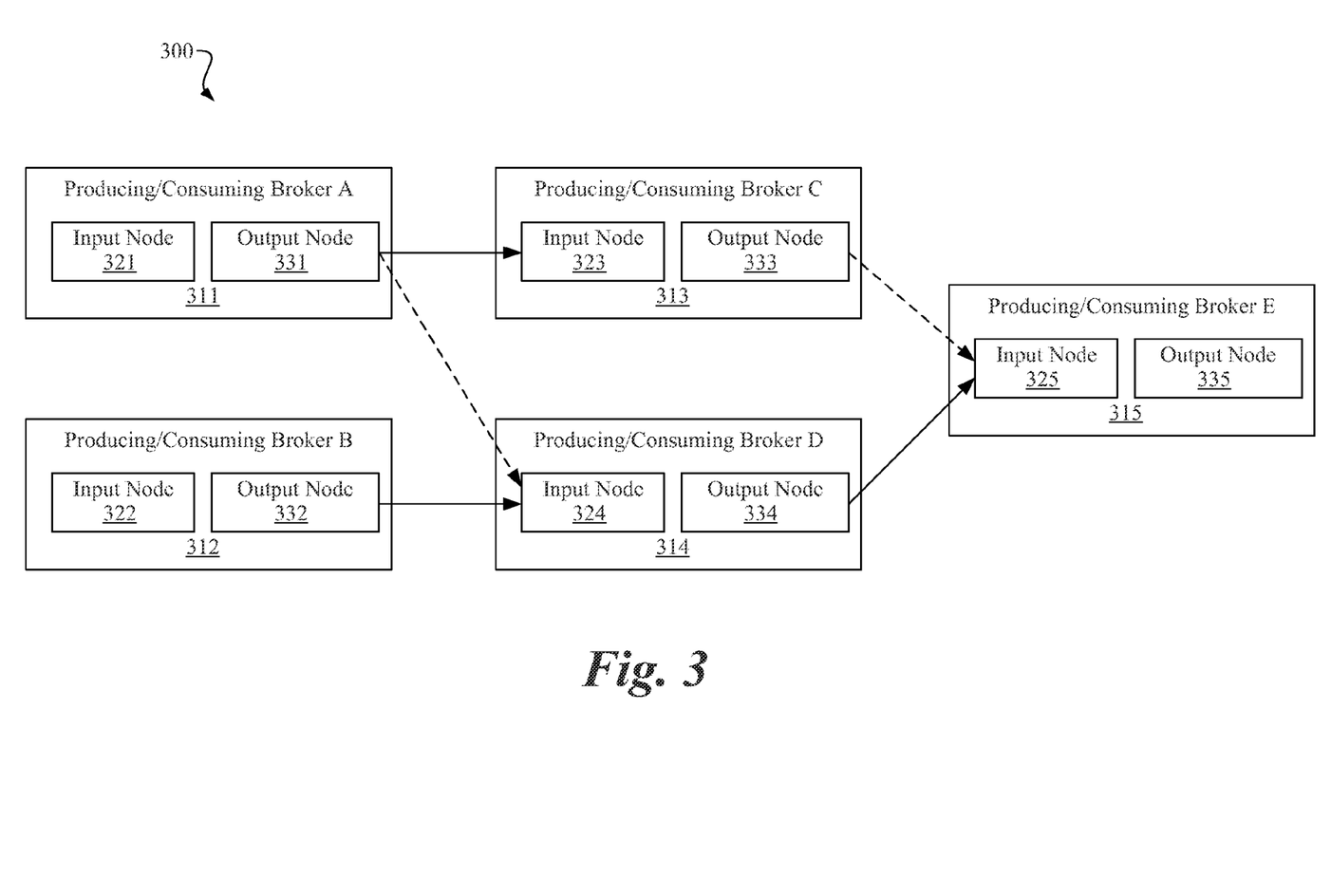
FIG. 3 is a block diagram of an illustrative path through a network of message brokers according to one exemplary embodiment of principles described herein.

Referring to FIG. 3, a network of brokers 300 is shown. Each message broker 311-319 may act as a producing broker and a consuming broker with an input node 321-329 and an output node 331-339.

Multiple message brokers, in this example, broker A and broker B 311-312 may process the same message and send it to another message broker, broker D 314 in the network 300. The message broker D 314 instead of receiving multiple copies of the same message, has a defined unique ownership which evaluates the ownership strengths of the multiple message brokers, broker A and broker B 311-312 based on liveliness, and selects only one of the message brokers, broker B 312 from which to receive the message. Similarly, broker C 313 may be receiving messages from broker A 311.

In the next transformation of the message, multiple message brokers, in this example, broker C and broker D 313-314 may process the same message and send it to another message broker, broker E 315 in the network 300. Broker E 315 has a reliable source of two publishers. The message broker E 315 instead of receiving multiple copies of the same message, has a defined unique ownership which evaluates the ownership strengths of the multiple message brokers, broker C and broker D 313-314 based on liveliness, and selects only one of the multiple message brokers, broker D 314 from which to receive the message.

Figure 4:
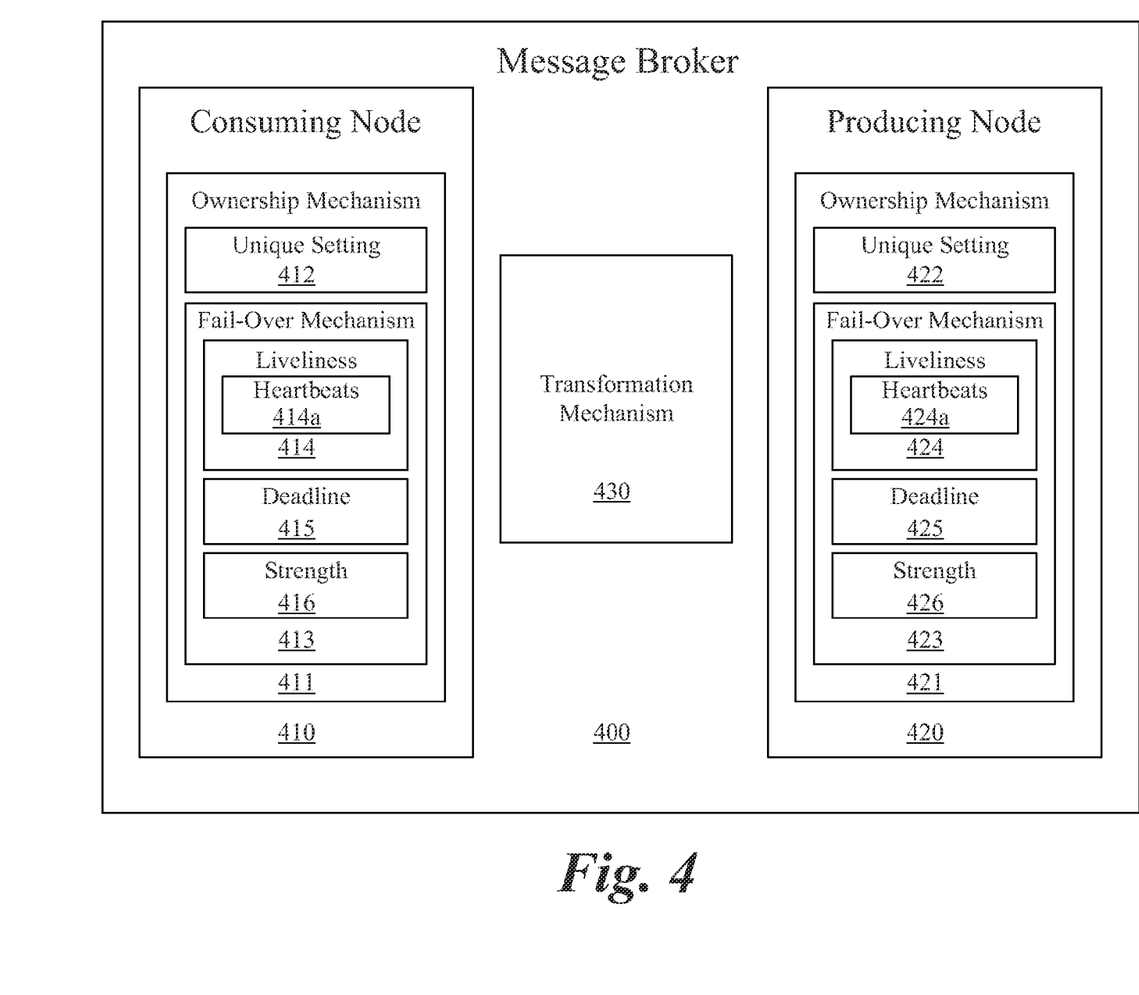
FIG. 4 is a block diagram of an illustrative message broker according to one exemplary embodiment of principles described herein.

Referring to FIG. 4, a block diagram shows a message broker 400. The message broker 400 includes a consuming node 410 and a producing node 420, with a transformation mechanism 430 for transforming messages.

The described message broker 400 includes an ownership mechanism 411, 421 at the consuming node 410 and at the producing node 420. The ownership mechanism 411, 421 includes a uniqueness setting 412, 422 and a fail-over mechanism 413, 423 for switching between publishers. The fail-over mechanism 413, 423 may include a liveliness measure 414, 424 (including heartbeat measure 414a, 424a), a deadline measure 415, 425, and a strength of ownership measure 416, 426.

Figure 5:
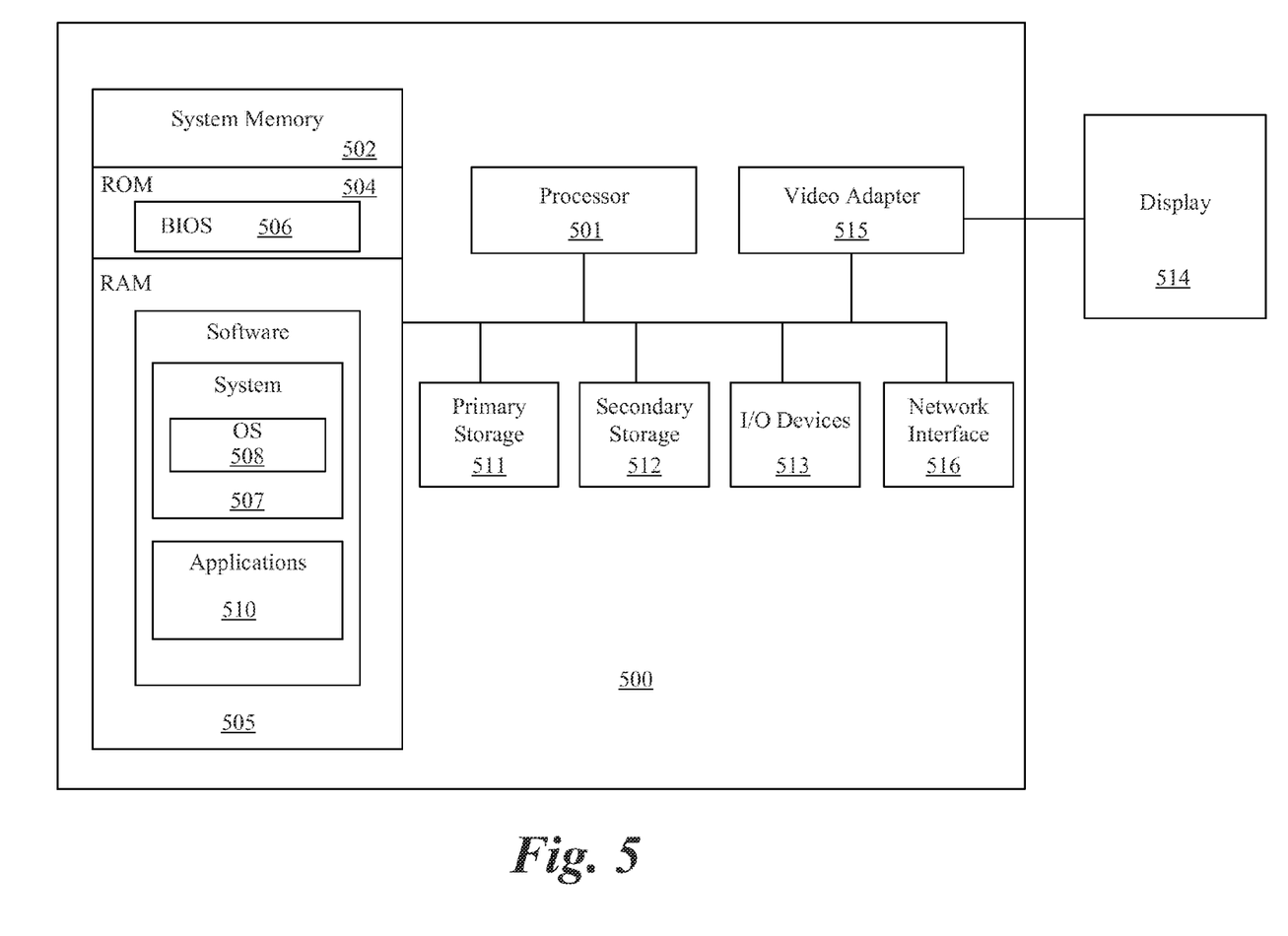
FIG. 5 is a block diagram of an illustrative computer system according to one exemplary embodiment of principles described herein.

Referring to FIG. 5, an exemplary system for implementing a message broker includes a data processing system 500 suitable for storing and/or executing program code including at least one processor 501 coupled directly or indirectly to memory elements through a bus system 503. The memory elements can include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. System software 507 may be stored in RAM 505 including operating system software 508. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 can be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

Figure 6:
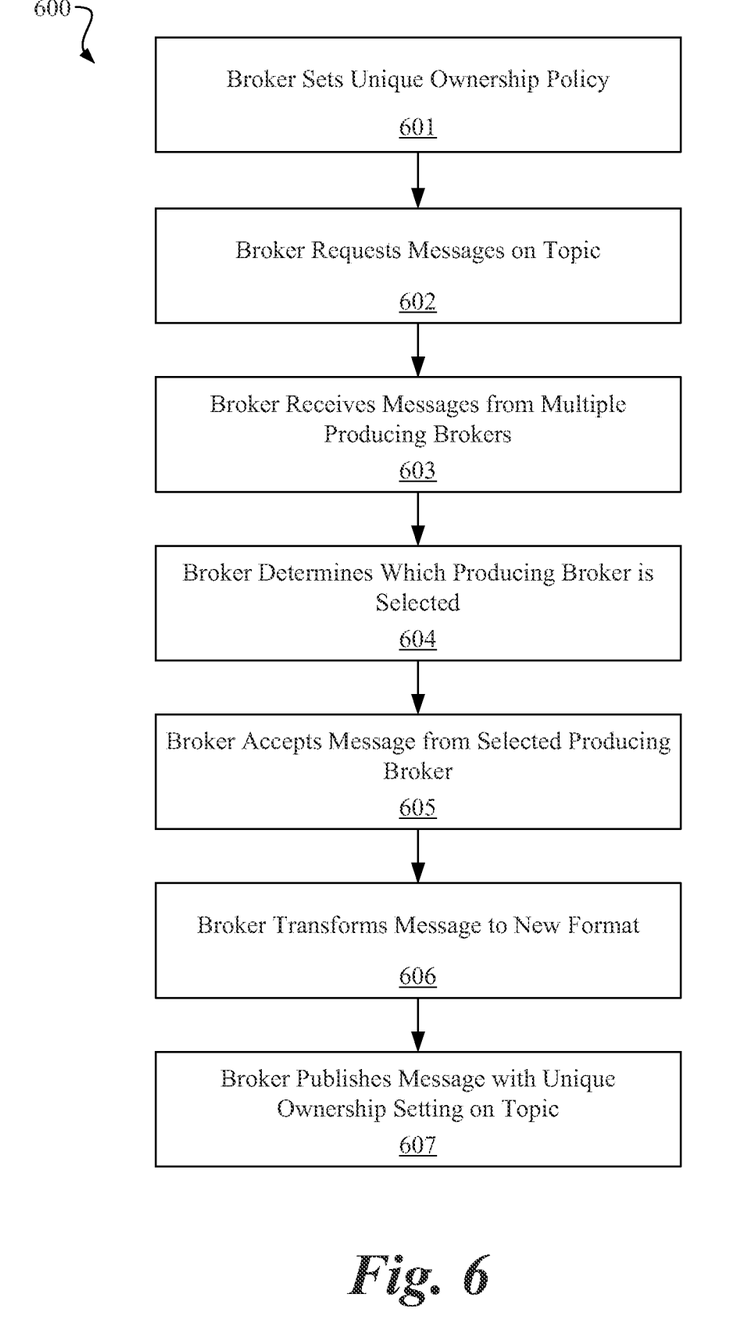
FIG. 6 is a flow diagram of an illustrative method of message transmission according to one exemplary embodiment of principles described herein.

Referring to FIG. 6, a flow diagram 600 shows the described method at a message broker. A broker sets 601 a unique ownership policy. The broker acting as a consuming broker requests 602 messages on a topic A. Multiple producing brokers publish on a topic and the consuming broker receives 603 messages from the multiple producing brokers.

The implementation of these steps is provider specific. In one embodiment, the messages are published regardless of whether there are any consumers, and the consumer decides which message to choose. This enables a quicker switch between messages if one publisher fails to send.

The consuming broker determines 604 which of the producing brokers is to be selected and accepts 605 the message from the selected producing broker.

The broker may transform 606 the message to a new format and publish 607 the message as a producing broker also with a unique ownership setting on the topic.

The selection process of a message may take various forms based on the liveliness, deadline, and/or strength of a producing broker.

There do not need to be two (or more) publishers at different strengths in order to achieve high-availability. Adding strength allows the user to say which they prefer. In another embodiment, the user may not define a strength function and one of the producing brokers will simply be selected. This is the same as if there are two publishers of equal strength.

A route is set up between the brokers such that an end-to-end, highly available, path is created. In known DDS uses, a hop-to-hop path is used with no brokering elements used.

At network creation time configuration is carried out to ensure the necessary broker paths. This requires consideration of the brokers in the system and working out which are peers or children of each other. A level of knowledge of what brokers and topics relate to each other is required to configure the broker network. If the service provided by each broker is defined and multiple brokers are providing the service, then a route can be configured based on producer and consumer requirements.

The concept is that each broker flow that is to interact with the end-to-end system has a consumer node which is a DDS consumer node. DDS has the concept that a topic can have a producer and consumer such that although there may be more than one producer on a given topic the consumer will only receive an update from one of the producers (single or unique ownership, as it is called in DDS). This system is used in order to provide high-availability of producers such that a system can have two producers on a topic and if one of the producers should fail to achieve its target heartbeat then the second producer automatically takes over production.

If a DDS producing and consuming node were created and placed into each flow in the broker network then each consumer has at least one path available to it at any given time. The level of redundancy can, of course, be increased such that there are more than two producers on any given topic.

Using this system it is only necessary to ensure that at any given time, there is at least one producer available on each topic. It is not necessary to dynamically alter broker output node routing tables, as this is done at the consuming node using the DDS "ownership" paradigms. Using this system also allows the broker flows to be used within a multi-cast environment for network performance optimization as DDS allows multicast protocols.

When a consumer requests a topic C they subscribe, using normal DDS concepts, to topic C where topic C is strongly typed (as per normal DDS paradigms). The DDS output nodes that output topic C are informed and start to publish on topic C to the consumer. At this point, it is noted that there may be more than one broker that can produce on topic C and thus, using normal DDS paradigms, it is necessary to ensure that the producer node and end consumer both have ownership set to "unique" i.e. that DDS ensures that the consumer only receives messages from the currently alive producer.

It is not necessary to do any more dynamic configuration than this as the configuration was done at network creation time to ensure that the necessary broker paths were potentially available when required.

To conclude the end-to-end picture, the broker that delivered the topic C to the end consumer has an input node that subscribes on topic Q (a topic in a particular format that it can convert to topic C format). If there are no such topic publishers available then this flow will not publish; however, the assumption is that there are enough brokers publishing with enough different input formats to achieve the given end-to-end path.

A single source of data can go through one or many message transformations in order to satisfy consumer demand. Therefore, it is probable that there is no single message broker that could satisfy all possible combinations of producer to consumer transformations and multiple broker paths will almost always have to be created in order to achieve the necessary message transformations. In a highly-available and robust broker network it is advantageous to have a broker concentrate on a single message transformation and thus reduce potential bottlenecks and fail-over points.

A producer to consumer path resolving system may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of message brokering in a consuming broker device of a publish-subscribe system comprising at least one processor, said method comprising:
   in said consuming broker device, designating a first producing broker device as a sole provider of messages having a topic to which said consuming broker device has subscribed; and
   in response to a determination that a measured livelihood of said first producing broker device is less than a defined threshold, designating with said consuming broker device a second producing broker device as said sole provider of said messages having said topic to said consuming broker device;
   wherein said second producing broker devices comprises a measured livelihood that is greater than said measured livelihood of said first producing broker device.

2. The method of claim 1, wherein said designating said first producing broker device as said sole provider of said messages having said topic to which said first consuming broker device has subscribed is based on a measured livelihood of said first producing broker device at a time of said designation.

3. The method of claim 1, further comprising:
   measuring said livelihood of said first producing broker device based on periodic heartbeat messages received at said consuming broker device from said first producing broker device; and
   measuring said livelihood of said second producing broker device based on periodic heartbeat messages received at said consuming broker device from said second producing broker device.

4. The method of claim 3, further comprising deducing with said consuming broker device that said measured livelihood of said first producing broker device is greater than said defined threshold if said consuming broker device has received a said heartbeat message from said first producing broker device before an expiration of a defined deadline.

5. The method of claim 3, further comprising deducing with said consuming broker device that said determined livelihood of said first producing broker device is less than said defined threshold if said consuming broker device has not received a message from said first producing broker device before an expiration of a defined deadline.

6. The method of claim 1, further comprising converting received messages in said first consuming broker device from a first format into a second format.

7. The method of claim 1, further comprising forwarding received messages from said consuming broker device to a second consuming broker device.

8. The method of claim 1, further comprising receiving said messages having said topic to which said first consuming broker device has subscribed at said consuming broker device according to a protocol that defines an ownership quality of service policy.

9. The method of claim 8, wherein said protocol comprises Data Distribution Services (DDS) protocol.

10. The method of claim 8, wherein said ownership quality of service policy is set to enforce unique ownership of messages.

11. A consuming broker device in a publish-subscribe system, said consuming broker device comprising:
    at least one processor; and
    an input port configured to receive messages having a topic to which said consuming broker device has subscribed;
    wherein said at least one processor is configured to:
       designate a first producing broker device as a sole provider of said messages having said topic to said consuming broker device; and
       in response to a determination that a measured livelihood of said first producing broker device is less than a defined threshold, designate a second producing broker device as said sole provider of said messages having said topic to said consuming broker device;
    wherein said second producing broker devices comprises a measured livelihood that is greater than said measured livelihood of said first producing broker device.

12. The consuming broker device of claim 11, wherein said designation of said first producing broker device as said sole provider of said messages having said topic to which said first consuming broker device has subscribed is based on a measured livelihood of said first producing broker device at a time of said designation.

13. The consuming broker device of claim 11, wherein said at least one processor is further configured to:
    measure said livelihood of said first producing broker device based on periodic heartbeat messages received from said first producing broker device; and
    measure said livelihood of said second producing broker device based on periodic heartbeat messages received from said second producing broker device.

14. The consuming broker device of claim 13, wherein said at least one processor is further configured to deduce that said determined livelihood of said first producing broker device is greater than said defined threshold if said consuming broker device has received a said heartbeat message from said first producing broker device before an expiration of a defined deadline.

15. The consuming broker device of claim 13, wherein said at least one processor is further configured to deduce that said determined livelihood of said first producing broker device is less than said defined threshold if said consuming broker device has not received a message from said first producing broker device before an expiration of a defined deadline.

16. The consuming broker device of claim 11, wherein said at least one processor is further configured to convert received messages from a first format into a second format.

17. The consuming broker device of claim 11, wherein said at least one processor is further configured to forward received messages to a second consuming broker device.

18. The consuming broker device of claim 11, wherein said at least one processor is further configured to receive said messages having said topic to which said first consuming broker device has subscribed according to a protocol that defines an ownership quality of service policy.

19. The consuming broker device of claim 18, wherein said ownership quality of service policy is set to enforce unique ownership of messages.

20. A computer program product for message brokering in a consuming broker device of a publish-subscribe system, the computer program product comprising:
- a computer readable storage device having computer readable program code embodied therewith, the computer readable program code comprising:
- computer readable program code configured to designate a first producing broker device as a sole provider of messages having a topic to which said first consuming broker device has subscribed; and
- computer readable program code configured to, in response to a determination that a measured livelihood of said first producing broker device is less than a defined threshold, designate with said consuming broker device a second producing broker device as said sole provider of said messages having said topic to said consuming broker device;
- wherein said second producing broker devices comprises a measured livelihood that is greater than said measured livelihood of said first producing broker device.

* * * * *